(12) United States Patent
Anderson et al.

(10) Patent No.: US 9,344,508 B2
(45) Date of Patent: May 17, 2016

(54) DYNAMICALLY LAUNCHING INTER-DEPENDENT APPLICATIONS BASED ON USER BEHAVIOR

(71) Applicant: International Business Machines Corporation, Armonk, NY (US)

(72) Inventors: Eric M. Anderson, Friendswood, TX (US); Nancy L. Bourne, Ajax (CA); Rajesh Radhakrishnan, Reston, VA (US); Hemant J. Sharma, Mumbai (IN)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 13/800,470

(22) Filed: Mar. 13, 2013

(65) Prior Publication Data

US 2014/0280861 A1    Sep. 18, 2014

(51) Int. Cl.
*H04L 29/08*     (2006.01)
*G06F 9/48*      (2006.01)
*G06F 15/173*    (2006.01)

(52) U.S. Cl.
CPC ..................................... *H04L 67/22* (2013.01)

(58) Field of Classification Search
CPC ..... G06F 9/485; G06F 15/173; G06F 3/1423; H04L 67/22

USPC .............................. 709/224; 718/100; 345/1.1
See application file for complete search history.

(56) References Cited

U.S. PATENT DOCUMENTS

| | | | |
|---|---|---|---|
| 6,742,033 B1 | 5/2004 | Smith et al. | |
| 7,152,018 B2 | 12/2006 | Wicks | |
| 7,581,181 B2 * | 8/2009 | White | 715/707 |
| 2004/0030882 A1 | 2/2004 | Forman | |
| 2009/0307692 A1 * | 12/2009 | Do et al. | 718/100 |
| 2009/0327482 A1 * | 12/2009 | Malhotra et al. | 709/224 |
| 2010/0064128 A1 * | 3/2010 | Mendelow et al. | 713/100 |
| 2010/0238089 A1 * | 9/2010 | Massand | 345/1.1 |
| 2011/0131479 A1 | 6/2011 | Padgett et al. | |

* cited by examiner

*Primary Examiner* — David Lazaro
*Assistant Examiner* — Zi Ye
(74) *Attorney, Agent, or Firm* — Jinesh P. Patel; John Pivnichny

(57) ABSTRACT

A computer system identifies a pattern of usage of the computer system by a first user, wherein the identified pattern of usage comprises of a first and a second step. The computer system determines the number of times that the first user performs the steps of the identified pattern of usage surpasses a first threshold value. The computer system creates an automation so that each time the first user performs the first step of the identified pattern of usage, the computer system performs the second step of the identified pattern of usage.

19 Claims, 4 Drawing Sheets

DYNAMICALLY LAUNCHING INTER-DEPENDENT APPLICATIONS BASED ON USER BEHAVIOR

FIELD OF THE INVENTION

The present invention relates generally to application usage and patterns, and more particularly to identifying application usage patterns and dynamically launching applications based on the identified application usage patterns.

BACKGROUND

In today's dynamic work environment, employees often are required to play multiple roles and perform multiple tasks within a short period of time. For example, an employee may have to jump from one application to another in order to view certain related data or perform certain related activities. This can lead to inefficiencies and a drop down in productivity, especially if the employee performs the same tasks and opens the same applications concurrently on a daily basis. Productivity is halted while the employee waits for each application to launch or for a response to certain commands. This has led to the development of several methods for improving employee productivity and wait time, which when totaled over a large period of time can add up to millions of dollars in lost revenue.

SUMMARY

Embodiments of the present invention provide a system, method, and program product for identifying application usage patterns and dynamically launching applications based on the identified application usage patterns. A computer system identifies a pattern of usage of the computer system by a first user, wherein the identified pattern of usage comprises of a first and a second step. The computer system determines that the number of times that the first user performs the steps of the identified pattern of usage surpasses a first threshold value. The computer system creates an automation so that each time the first user performs the first step of the identified pattern of usage, the computer system performs the second step of the identified pattern of usage.

A computer system identifies that at least one step is performed on the computer system at time one, wherein time one is a period of time within a time block, the time block representing an interval of time that repeats continuously. The computer system determines that the number of times that the at least one step is performed at time one surpasses a first threshold. The computer system creates an automation so that at time one, the computer system performs the at least one step.

DETAILED DESCRIPTION

Figure 1:
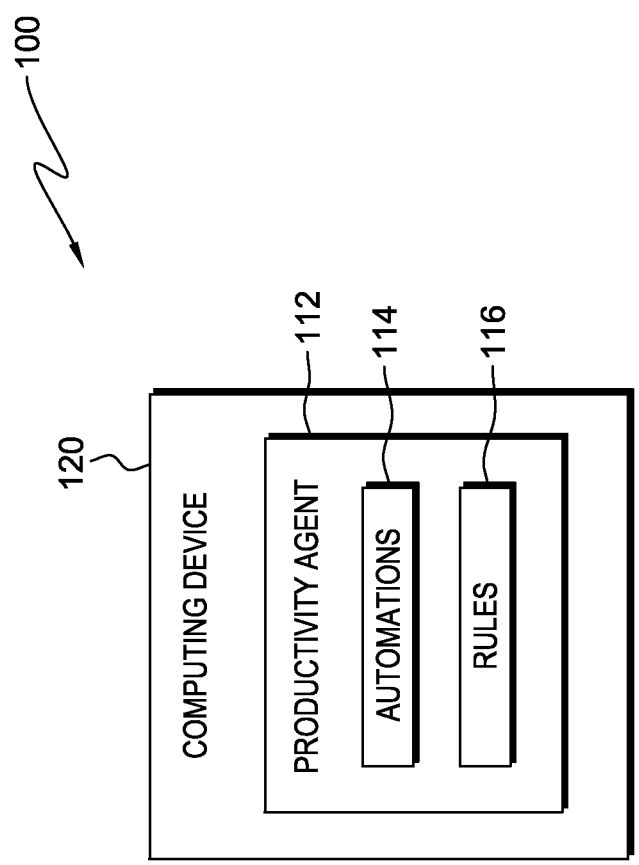
FIG. 1 illustrates a usage pattern identification system, in accordance with an embodiment of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of one or more computer-readable medium(s) may be utilized. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program, for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions, which execute on the computer or other programmable apparatus, provide processes for implementing the functions/acts specified in the flowchart and/or block diagram block or blocks.

Embodiments of the present invention will now be described in detail with reference to the accompanying Figures.

FIG. 1 illustrates usage pattern identification system 100, in accordance with an embodiment of the invention. In the exemplary embodiment, usage pattern identification system 100 includes computing device 120; however, in other embodiments usage pattern identification system 100 can include multiple computing devices interconnected over a network. This alternate embodiment is described in further detail below.

Computing device 120 includes productivity agent 112. Computing device 120 may be a desktop computer, a notebook, a laptop computer, a tablet computer, a handheld device, a smart-phone, a thin client, or any other electronic device or computing system capable of receiving and sending data to and from other computing devices via a network. While computing device 120 is shown as a single device, in other embodiments, computing device 120 may be comprised of a cluster or plurality of computing devices, working together or working separately. Computing device 120 is described in more detail with reference to FIG. 4.

Productivity agent 112 includes automations 114 and rules 116. In the exemplary embodiment, productivity agent 112 includes components to analyze usage and operations information of computing device 120, identify usage patterns, create automations 114 based on the identified usage patterns, and implement the automations on computing device 120. The operation of productivity agent 112 is described in further detail below with reference to FIG. 2.

In the exemplary embodiment, rules 116 is a plurality of rules, each rule describing a specific usage pattern for computing device 120, identified from usage and operations information collected by productivity agent 112. In other embodiments, rules 116 can be input by a system administrator or a user. In other embodiments, a rule of rules 116 can describe multiple usage patterns for computing device 120. Rules 116 is described in further detail with reference to FIG. 2.

In the exemplary embodiment, automations 114 is program instructions created based on at least one rule of rules 116, which automate a certain event or events based on a certain condition or conditions being satisfied. For example, an automation can state that a specific spreadsheet application should be run every day at 3 PM. In this case, the condition is time-based and the event is launching the specific spreadsheet application. In other embodiments, the condition(s) to be satisfied may be the opening of a certain program such as a word processor or making a certain window the active window or a variety of other activities. Automations 114 is described in further detail with reference to FIG. 2.

Figure 2:
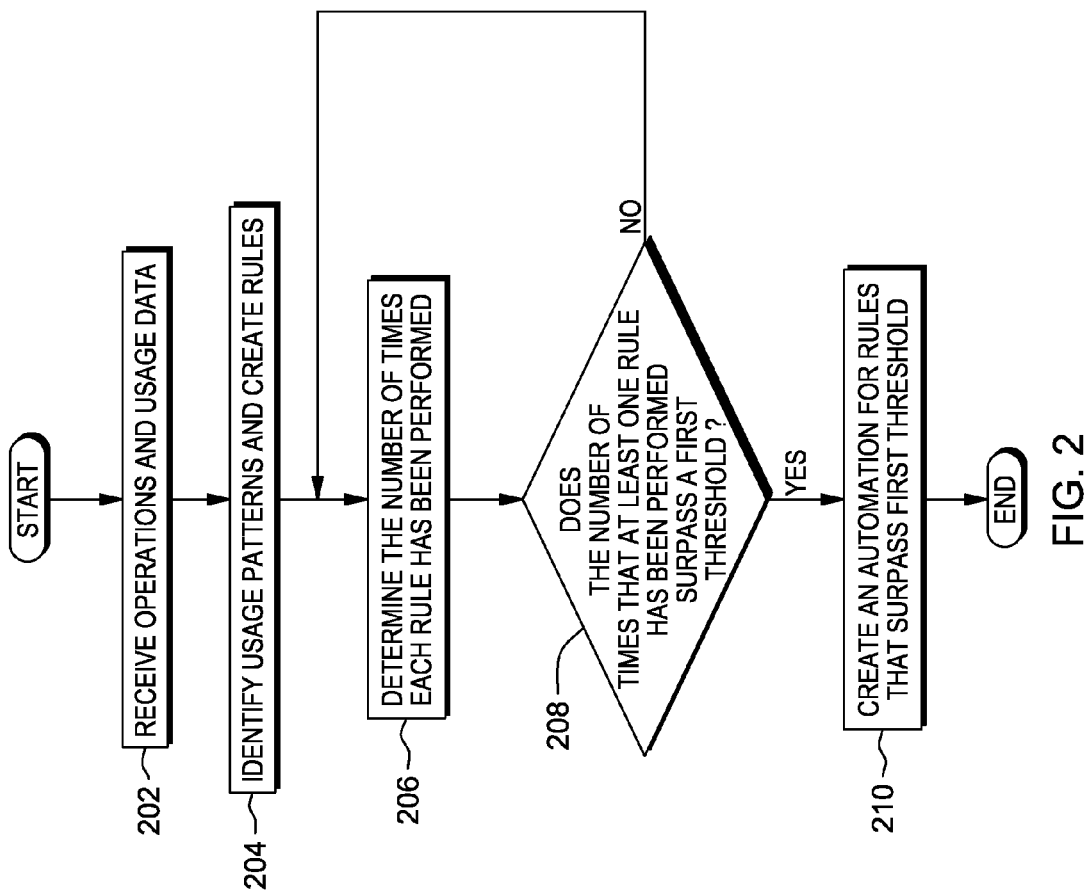
FIG. 2 is a flowchart illustrating the operations of the productivity agent program of FIG. 1 in identifying usage patterns and creating automations, in accordance with an embodiment of the invention.

FIG. 2 is a flowchart illustrating the operations of productivity agent 112 in identifying usage patterns of a computing device and creating automations, in accordance with an exemplary embodiment of the invention. In an exemplary embodiment, productivity agent 112 collects operations and usage data of computing device 120 from the operating system (step 202). Operations and usage data can include any and all information regarding computing device operations such as information detailing which applications and processes were launched and closed, what time the applications/processes were launched and closed, what order they were launched and closed, and other usage behavior such as jumping patterns between one window to another or one monitor to another.

Productivity agent 112 then identifies usage patterns within the operations and usage data collected from the operating system of computing device 120 and creates rules 116 (step 204). In the exemplary embodiment, productivity agent 112 checks for patterns related to order and time, or a variety of other factors. For example, if the operations and usage data collected from the operating system of computing device 120 details a word processor being launched and then a spreadsheet application being launched 5 seconds later, productivity agent 112 can create a rule describing this usage pattern. In addition, rules 116 can describe time-based patterns as well. For example, if the operations and usage data collected from the operating system of computing device 120 details the word processor being launched at 11:10 AM every other day, productivity agent 112 can create a rule describing this usage pattern. In other embodiments, a system administrator can directly input a rule or a set of rules into productivity agent 112. In the exemplary embodiment, a rule or each rule of rules 116 can be programmed to be valid for only a certain period of time or valid only if certain applications remain present on computing device 120. In addition, in the exemplary embodiment, productivity agent 112 can create rules specific to a user of computing device 120 based on usage and operations data of the user collected from the operating system. Therefore, productivity agent 112 can create a first rule or first set of rules for a first user of computing device 120 based on the first user's usage and operations activity collected from the operating system, and a second rule or second set of rules for a second user of computing device 120 based on the second user's usage and operations activity.

Productivity agent 112 then determines the number of times each rule has been performed on computing device 120 (step 206). For example, with regard to the example above, productivity agent 112 may analyze the operations and usage data collected and determine that the spreadsheet application was launched 5 seconds after the word processor 70 times. In the exemplary embodiment, productivity agent 112 collects operations and usage data from the operating system of computing device 120 on a continual basis so that the rules created and the determined number of times that each rule has been performed is up-to-date. For situations where productivity agent 112 creates rules specific to a user, productivity agent 112 only counts the number of times the specific rule has been performed by the specific user. For example, if productivity agent 112 creates a first rule specific to a first user, productivity agent 112 begins counting the number of times the first rule has been performed only when the first user is logged in.

Therefore, if a second user logs in and performs the steps of the rule, productivity agent 112 will not count the performance of the rule.

Productivity agent 112 then determines if the number of times that at least one of the rules has been performed surpasses a first threshold value (decision 208). In the exemplary embodiment, the first threshold value is 50, however, in other embodiments, the first threshold value may be another value left to the discretion of the programmer or user. In other embodiments, there may be multiple threshold values, with different rules having different threshold values. If productivity agent 112 determines that the number of times that at least one of the rules has been performed does not surpass a first threshold value (decision 208, "NO" branch), productivity agent 112 moves back to step 206 and once again determines the number of times each rule has been performed. As stated above, in the exemplary embodiment, productivity agent 112 receives operations and usage data from the operating system of computing device 120 on a continual basis, so the new data received may contain further instances of one or more of the rules being performed.

If productivity agent 112 determines that the number of times at least one rule has been performed surpasses a first threshold value (decision 208, "YES" branch), productivity agent 112 creates an automation for each rule that was performed enough times to surpass the first threshold value (step 210). For example, with regard to the example above, if productivity agent 112 analyzes the operations and usage data collected from the operating system of computing device 120 and determines the rule that describes the spreadsheet application being launched 5 seconds after the word processor was performed enough times to surpass the first threshold value, productivity agent 112 creates an automation, wherein the condition is the word processor being launched and the automated event is the launching of the spreadsheet application. If the relevant user of computing device 120 subsequently launches the word processor, productivity agent 112 determines a condition match with a stored automation and automatically launches the spreadsheet application. As stated above, productivity agent 112 can create rules specific to a user of computing device 120. In the exemplary embodiment, productivity agent 112 can also create automations specific to a user of computing device 120. For example, if productivity agent 112 creates an automation for the rule that describes the spreadsheet application being launched 5 seconds after the word processor and creates it specific to a first user, if a second user subsequently logs in and performs the conditional step of launching the word processor, productivity agent 112 will not perform the automated event of launching the spreadsheet application.

Figure 3:
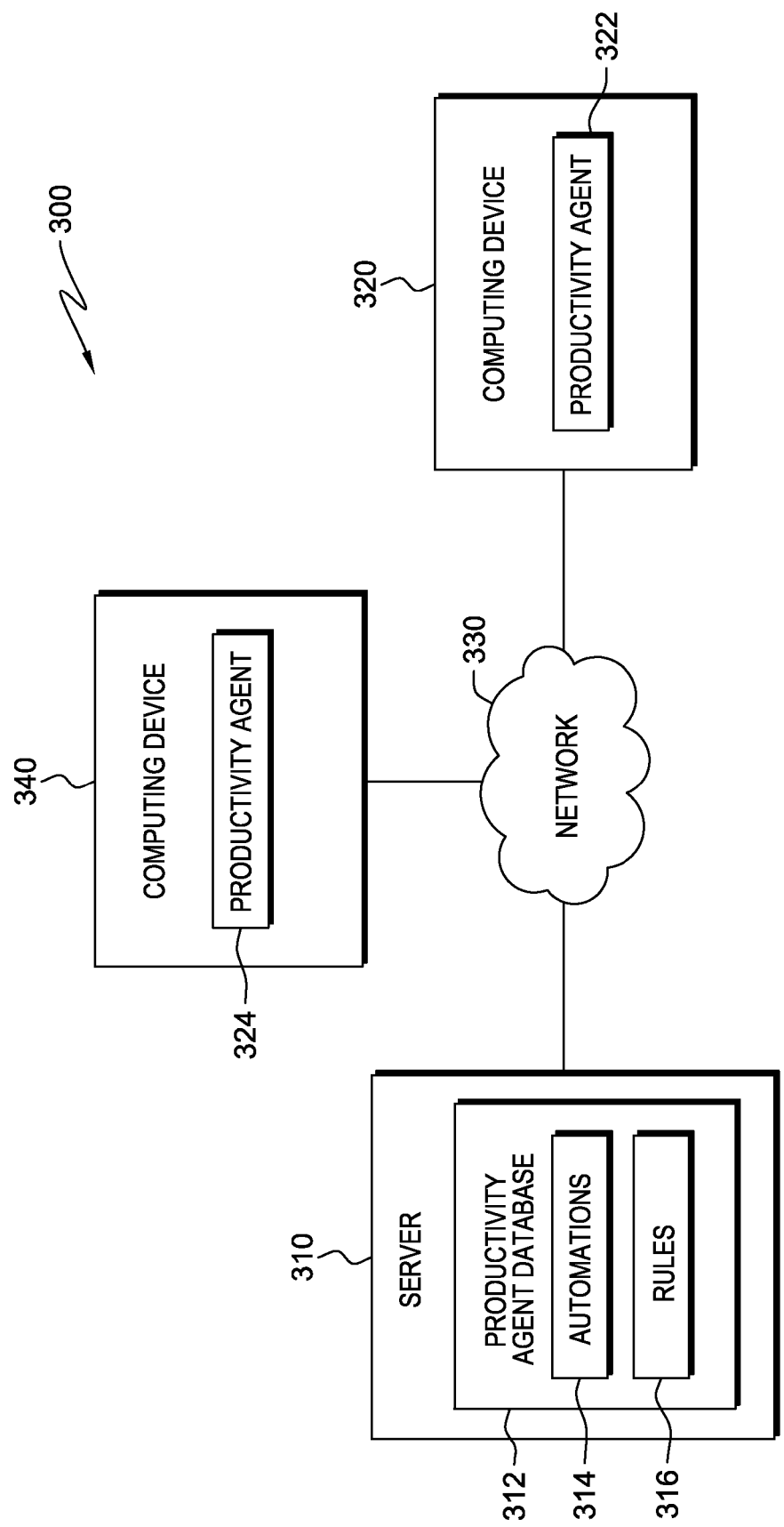
FIG. 3 illustrates a multi-device usage pattern identification system, in accordance with an embodiment of the invention.

FIG. 3 illustrates an alternate multi-device embodiment, multi-device usage pattern identification system 300, in accordance with an embodiment of the invention. Multi-device usage pattern identification system 300 includes server 310, computing device 340 and computing device 320 all interconnected over network 330.

In an exemplary embodiment, network 330 is the Internet, representing a worldwide collection of networks and gateways to support communications between devices connected to the Internet. Network 330 may include, for example, wired, wireless or fiber optic connections. In other embodiments, network 330 may be implemented as an intranet, a local area network (LAN), or a wide area network (WAN). In general, network 330 can be any combination of connections and protocols that will support communications between server 310, computing device 320 and computing device 340, in accordance with embodiments of the invention.

Computing device 320 includes productivity agent 322. Computing device 320 may be a desktop computer, a notebook, a laptop computer, a tablet computer, a handheld device, a smart-phone, a thin client, or any other electronic device or computing system capable of receiving and sending data to and from other computing devices such as computing device 340 or server 330 via network 330. While computing device 320 is shown as a single device, in other embodiments, computing device 320 may be comprised of a cluster or plurality of computing devices, working together or working separately. Computing device 320 is described in more detail with reference to FIG. 4.

Productivity agent 322 is a software application capable of monitoring the operations and usage of computing device 320, creating rules from identified usage patterns, creating automations based on the rules, transmitting the rules and automations to the server 310 for storage, downloading rules and automations from server 310, and implementing automations on computing device 320. In the exemplary embodiment, productivity agent 322 monitors the operations and usage of computing device 320 by communicating with the operating system.

Computing device 340 includes productivity agent 324. Computing device 340 may be a desktop computer, a notebook, a laptop computer, a tablet computer, a handheld device, a smart-phone, a thin client, or any other electronic device or computing system capable of receiving and sending data to and from other computing devices such as computing device 320 or server 310 via network 330. While computing device 340 is shown as a single device, in other embodiments, computing device 340 may be comprised of a cluster or plurality of computing devices, working together or working separately. Computing device 340 is described in more detail with reference to FIG. 4.

Productivity agent 324 is a software application capable of monitoring the operations and usage of computing device 340, creating rules from identified usage patterns, creating automations based on performance of the rules, transmitting the rules and automations to the server 310 for storage, downloading rules and automations from server 310, and implementing automations on computing device 340. In the exemplary embodiment, productivity agent 324 monitors the operations and usage of computing device 340 by communicating with the operating system. In the exemplary embodiment, productivity agent 322 and productivity agent 324 are substantially equivalent software applications.

Server 310 includes productivity agent database 312. Server 310 may be a desktop computer, a notebook, a laptop computer, a tablet computer, a handheld device, a smart-phone, a thin client, or any other electronic device or computing system capable of receiving and sending data to and from computing device 320 and computing device 340 via network 330. Server 310 is described in more detail with reference to FIG. 4.

Productivity agent database 312 includes automations 314 and rules 316. In the exemplary embodiment, productivity agent database 312 is capable of and storing rules 316 and automations 314 received from computing devices 320 and 340 or input directly by an administrator or a user. Productivity agent database 312 is also capable of transmitting all or part of rules 316 and/or automations 314 to computing device 320 or computing device 340 or both.

In the exemplary embodiment, rules 316 is a plurality of rules, each rule is data describing a specific usage pattern for computing device 320 or computing device 340, identified from usage and operations information collected by productivity agent 322 on computing device 320 and/or productivity agent 324 on computing device 340 via network 330, or input directly into productivity agent database 312 by an administrator or user. In other embodiments, a rule of rules 316 can describe multiple usage patterns for computing device 320 and/or computing device 340. In further embodiments, rules 316 can be stored locally on computing device 320 or computing device 340. In the exemplary embodiment, automations 314 is program instructions created by productivity agent 322 and/or productivity agent 324 based on rules 316, which automate a certain event or events based on a certain condition or conditions being satisfied. Automations 314 can also be wholly or partially input directly into productivity agent database 312 by an administrator or user. In other embodiments, automations 314 can be stored locally on computing devices 320 or computing device 340.

In this multi-device embodiment, productivity agent 322 and productivity agent 324 collect operations and usage information from the operating system of computing devices 320 and 340, respectively. Productivity agents 322 and 324 then create rules in a similar manner as described above by identifying usage patterns for each computing device based on the collected operations and usage information. As stated above, rules can also be input directly into computing device 320 or computing device 340 or into productivity agent database 312 and then downloaded via network 330. In the exemplary embodiment, rules 316 is coded to a specific user. Productivity agent 322 and/or 324 then determine(s) the number of times the user performs the rule and compares the number to a first threshold value. If productivity agent 322 and/or 324 determine(s) the number of times the user performs the rule surpasses the first threshold value, productivity agent 322 and/or 324 create(s) an automation. For example, when a first user logs onto computing device 320, productivity agent 322 downloads the rules of rules 316 that pertain to the first user via network 330. Productivity agent 322 then determines the number of times that the rule is performed by the first user, and if the number of times surpasses a first threshold value, productivity agent 322 creates an automation. In addition, in the background, productivity agent 322 continuously collects and analyzes operations and usage information of the first user, identifying usage patterns and creating rules if new usage patterns are identified. Once the first user logs off, productivity agent 322 uploads any newly created rules and automations for the first user to productivity agent database 312 via network 330. The next time the first user logs on, the process starts all over again with the newly created rules and automations being downloaded along with the prior rules and automations. In the exemplary embodiment, productivity agent 324 operates in a similar fashion.

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

Figure 4:
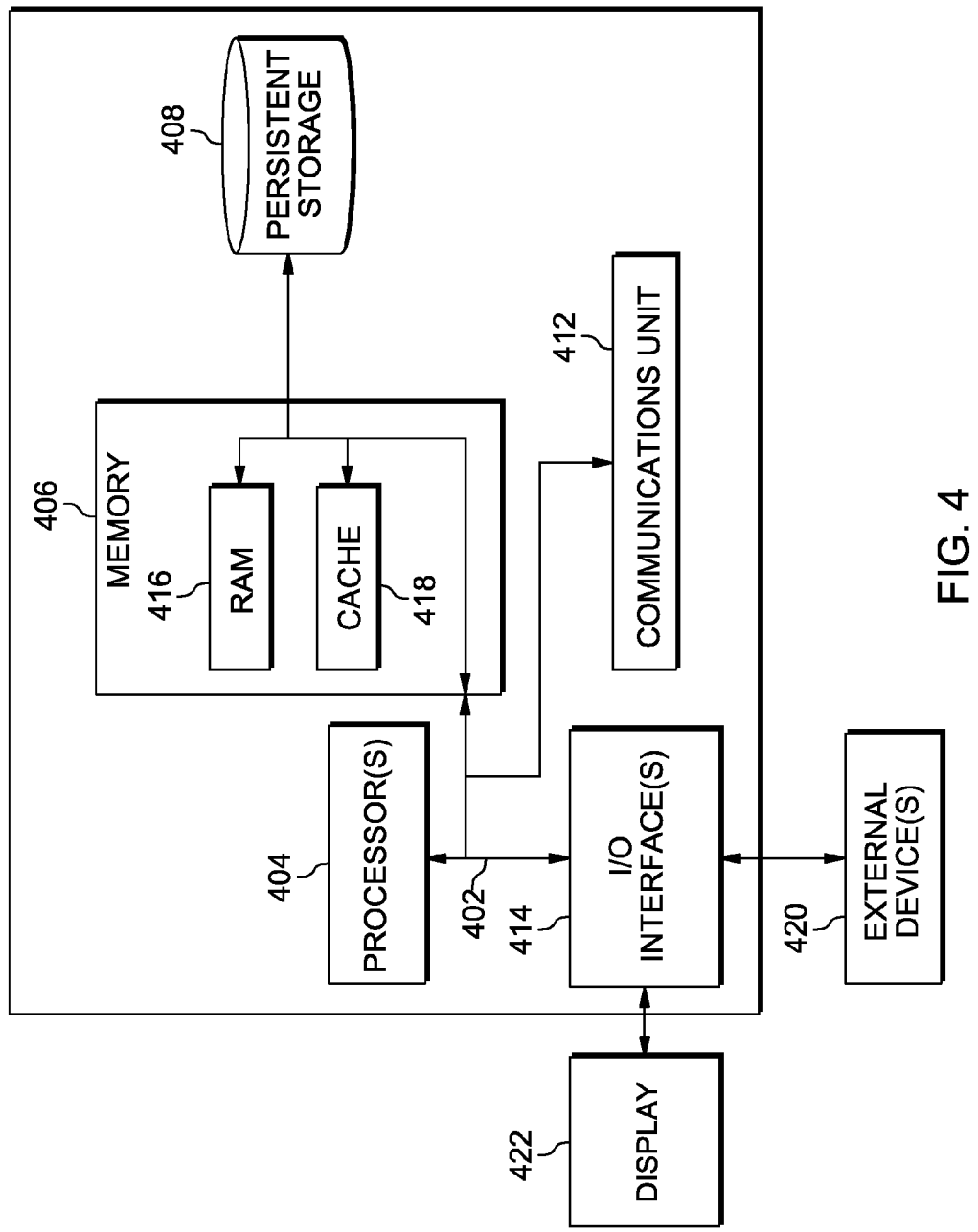
FIG. 4 is a block diagram depicting the hardware components of the usage pattern identification system of FIG. 1, in accordance with an embodiment of the invention.

FIG. 4 depicts a block diagram of components of computing device 120, server 310, computing device 320 and computing device 340 in accordance with an illustrative embodiment of the present invention. It should be appreciated that FIG. 4 provides only an illustration of one implementation and does not imply any limitations with regard to the environments in which different embodiments may be implemented. Many modifications to the environment may be made.

Computing device 120, server 310, computing device 320 and computing device 340 include communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media.

The programs productivity agent 112, automations 114 and rules 116 in computing device 120; programs productivity agent database 312, automations 314 and rules 316 in server 310; programs productivity agent 322 in computing device 320; and program productivity agent 324 in computing device 340 are stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. The programs productivity agent 112, automations 114 and rules 116 in computing device 120; programs productivity agent database 312, automations 314 and rules 316 in server 310; programs productivity agent 322 in computing device 320; and program productivity agent 324 in computing device 340 may be downloaded to persistent storage 408 through communications unit 412.

I/O interface(s) 414 allows for input and output of data with other devices that may be connected to computing device 120, server 310, computing device 320 and computing device 340. For example, I/O interface(s) 414 may provide a connection to external device(s) 420 such as a keyboard, keypad, a touch screen, and/or some other suitable input device. External device(s) 420 can also include portable computer-readable storage media such as, for example, thumb drives, portable optical or magnetic disks, and memory cards. Software and data used to practice embodiments of the present invention, i.e., the programs productivity agent 112, automations 114 and rules 116 in computing device 120; programs productivity agent database 312, automations 314 and rules 316 in server 310; programs productivity agent 322 in computing device 320; and program productivity agent 324 in computing device 340, can be stored on such portable computer-readable storage media and can be loaded onto persistent storage 408 via I/O interface(s) 414. I/O interface(s) 414 can also connect to a display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for identifying usage patterns of a user of a computing system, comprising the steps of:
    a computer system identifying a pattern of usage of the computer system by a first user, wherein the identified pattern of usage comprises of a first and a second step, and wherein performing the first and second step include moving from an active window on a first monitor to an active window on a second monitor to view related data or perform related activities, and wherein the first step is associated with a first application, and the second step is associated with a second application, and wherein the identified pattern of usage is transmitted from the computer system to store on a central database on a server over a network in association with the first user;
    the computer system detecting a second user has performed the steps of the identified pattern of usage;
    the computer system determining that the number of times that the first user performs the steps of the identified pattern of usage surpasses a first threshold value; and
    based on determining that the number of times that the first user performs the steps of the identified pattern of usage surpasses the first threshold, the computer system creating an automation specific to the first user so that each time the first user performs the first step of the identified pattern of usage on the active window on the first monitor, the computer system performs the second step of the identified pattern of usage on the active window on the second monitor, wherein the automation is transmitted and stored in the central database in association with the first user, and wherein when the first user logs in to the computer system, the computer system retrieves the automation from the central database.

2. The method of claim 1, wherein the computer system comprises of a first computer and a second computer.

3. The method of claim 2, wherein the computer system comprises of a first computer and a second computer connected via a network.

4. The method of claim 1, further comprising the step of the computer system removing the automation after a first period of time has expired.

5. The method of claim 1, further comprising the step of the computer system removing the automation if the first or second step is unable to be performed by the computer system.

6. The method of claim 1, further comprising the step of the computer system receiving input from the first user identifying another pattern of usage of the computer system.

7. A method for identifying time-based usage patterns on a computer system, comprising the steps of:
    a computer system identifying that at least one step is performed on the computer system at time one by a first user, wherein time one is a period of time within a time block, the time block representing an interval of time that repeats continuously, and wherein performing the at least one step includes moving from an active window on a first monitor to an active window on a second monitor application to view related data or perform related activities, and wherein the identified at least one step performed at time one is transmitted from the computer system to store on a central database on a server over a network in association with the first user;
    the computer system determining that the number of times that the at least one step is performed by a first user at time one surpasses a first threshold; and
    based on determining that the number of times that the at least one step is performed by the first user surpasses the first threshold, the computer system creating an automation specific to the first user so that at time one, the computer system performs the at least one step, wherein the automation is transmitted and stored in the central database in association with the first user, and wherein when the first user logs in to the computer system, the computer system retrieves the automation from the central database.

8. A computer program product for identifying usage patterns of a user of a computing system, the computer program product comprising:
    one or more computer-readable storage devices and program instructions stored on at least one of the one or more tangible storage devices, the program instructions comprising:
    program instructions to identify a pattern of usage of a computer system by a first user, wherein the identified pattern of usage comprises of a first and a second step, and wherein performing the first and second step include moving from an active window on a first monitor to an active window on a second monitor to view related data or perform related activities, and wherein the first step is associated with a first application and the second step is associated with a second application, and wherein the identified pattern of usage is transmitted from the computer system to store on a central database on a server over a network in association with the first user;
    program instructions to determine that the number of times that the first user performs the steps of the identified pattern of usage surpasses a first threshold value; and
    based on determining that the number of times that the first user performs the steps of the identified pattern of usage surpasses the first threshold, program instructions to create an automation specific to the first user so that each time the first user performs the first step of the identified pattern of usage on the active window on the first monitor, the computer system performs the second step of the identified pattern of usage on the active window on the second monitor, wherein the automation is transmitted and stored in the central database in association with the first user, and wherein when the first user logs in to the computer system, the program instructions further comprise program instructions to retrieve the automation from the central database.

9. The computer program product of claim 8, wherein the computer system comprises of a first computer and a second computer.

10. The computer program product of claim 9, wherein the computer system comprises of a first computer and a second computer connected via a network.

11. The computer program product of claim 8, further comprising program instructions to remove the automation after a first period of time has expired.

12. The computer program product of claim 8, further comprising program instructions to remove the automation if the first or second step is unable to be performed by the computer system.

13. The computer program product of claim 8, further comprising program instructions to receive input from the first user identifying another pattern of usage of the computer system.

14. A computer system for identifying usage patterns of a user of a computing system, the computer system comprising:
one or more processors, one or more computer-readable memories, one or more computer-readable tangible storage devices, and program instructions stored on at least one of the one or more storage devices for execution by at least one of the one or more processors via at least one of the one or more memories, the program instructions comprising:
program instructions to identify a pattern of usage of a computer system by a first user, wherein the identified pattern of usage comprises of a first and a second step, and wherein performing the first and second step include moving from an active window on a first monitor to an active window on a second monitor to view related data or perform related activities, and wherein the first step is associated with a first application and the second step is associated with a second application, and wherein the identified pattern of usage is transmitted from the computer system to store on a central database on a server over a network in association with the first user;
program instructions to determine that the number of times that the first user performs the steps of the identified pattern of usage surpasses a first threshold value; and
based on determining that the number of times that the first user performs the steps of the identified pattern of usage surpasses the first threshold, program instructions to create an automation specific to the first user so that each time the first user performs the first step of the identified pattern of usage on the active window on the first monitor, the computer system performs the second step of the identified pattern of usage on the active window on the second monitor, wherein the automation is transmitted and stored in the central database in association with the first user, and wherein when the first user logs in to the computer system, the program instructions further comprise program instructions to retrieve the automation from the central database.

15. The computer system of claim 14, wherein the computer system comprises of a first computer and a second computer.

16. The computer system of claim 15, wherein the computer system comprises of a first computer and a second computer connected via a network.

17. The computer system of claim 14, further comprising program instructions to remove the automation after a first period of time has expired.

18. The computer system of claim 14, further comprising program instructions to remove the automation if the first or second step is unable to be performed by the computer system.

19. The computer system of claim 14, further comprising program instructions to receive input from the first user identifying another pattern of usage of the computer system.

\* \* \* \* \*